(12) United States Patent  
Rink et al.

(10) Patent No.: US 6,634,302 B1  
(45) Date of Patent: Oct. 21, 2003

(54) AIRBAG INFLATION GAS GENERATION

(75) Inventors: Karl K. Rink, Liberty, UT (US); Walter A. Moore, Elizabeth, CO (US)

(73) Assignee: Autoliv ASP, Inc., Ogden, UT (US)

( * ) Notice: Subject to any disclaimer, the term of this patent is extended or adjusted under 35 U.S.C. 154(b) by 192 days.

(21) Appl. No.: 09/724,295

(22) Filed: Nov. 28, 2000

Related U.S. Application Data

(63) Continuation-in-part of application No. 09/495,975, filed on Feb. 2, 2000, and a continuation-in-part of application No. 09/497,049, filed on Feb. 2, 2000.

(51) Int. Cl.$^7$ ................................................. C06D 5/00
(52) U.S. Cl. ........................ 102/530; 102/531; 280/741
(58) Field of Search ...................... 149/1, 74; 102/530, 102/531; 280/736, 737, 741

(56) References Cited

U.S. PATENT DOCUMENTS

| | | |
|---|---|---|
| 5,060,973 A | 10/1991 | Giovanetti |
| 5,076,607 A | 12/1991 | Woods et al. |
| 5,330,730 A | 7/1994 | Brede et al. |
| 5,466,313 A | 11/1995 | Brede et al. |
| 5,470,104 A | 11/1995 | Smith et al. |
| 5,494,312 A | 2/1996 | Rink |
| 5,504,288 A | 4/1996 | Morin |
| 5,531,473 A | 7/1996 | Rink et al. |
| 5,536,339 A | 7/1996 | Verneker |
| 5,571,988 A | 11/1996 | Hagel et al. |
| 5,586,386 A | 12/1996 | Morin |
| 5,607,181 A | 3/1997 | Richardson et al. |
| 5,613,703 A | 3/1997 | Fischer |
| 5,649,720 A | 7/1997 | Rink et al. |
| 5,669,629 A | 9/1997 | Rink |
| 5,673,933 A | 10/1997 | Miller et al. |
| 5,683,104 A | 11/1997 | Smith |
| 5,725,699 A | 3/1998 | Hinshaw et al. |
| 5,735,118 A | 4/1998 | Hinshaw et al. |
| 5,762,369 A | 6/1998 | Mooney et al. |
| 5,803,493 A | 9/1998 | Paxton et al. |
| 5,806,885 A | 9/1998 | Hock |
| 5,884,938 A | 3/1999 | Rink et al. |
| 5,890,735 A | 4/1999 | Smith |
| 5,893,583 A | 4/1999 | Blumenthal et al. |
| 5,924,728 A | 7/1999 | Evans et al. |
| 5,941,562 A | 8/1999 | Rink et al. |
| 6,062,599 A | 5/2000 | Forbes et al. |
| 6,083,331 A | 7/2000 | Taylor et al. |
| 6,098,548 A | 8/2000 | Rink et al. |
| 6,103,030 A | 8/2000 | Taylor et al. |
| 6,117,254 A | 9/2000 | Rink et al. |
| 6,221,186 B1 | 4/2001 | Rink et al. |

FOREIGN PATENT DOCUMENTS

WO 98/06682 2/1998

*Primary Examiner*—Peter M. Poon  
*Assistant Examiner*—Aileen B. Felton  
(74) *Attorney, Agent, or Firm*—Sally J. Brown; James D. Erickson

(57) ABSTRACT

An inflator apparatus for inflating an inflatable device is provided wherein a gas generant reactant reacts with oxygen to produce a gaseous inflation medium. The apparatus includes a closed first chamber wherein a supply of oxygen and a quantity of at least one unreactive reaction modifier are stored. The apparatus also includes an initiator to initiate reaction of at least a fraction of the supply of oxygen with the gas generant reactant to produce a quantity of the gaseous inflation medium. Also provided are associated methods for inflating an inflatable safety device in a vehicle.

23 Claims, 10 Drawing Sheets

AIRBAG INFLATION GAS GENERATION

CROSS REFERENCE TO RELATED APPLICATIONS

This application is a continuation-in-part application of prior U.S. patent application Ser. No. 09/495,975, filed on Feb. 2, 2000 and prior U.S. patent application Ser. No. 09/497,049, also filed on Feb. 2, 2000, respectively. The co-pending parent applications and the disclosures thereof are hereby incorporated by reference herein and are made a part hereof, including but not limited to those portions which specifically appear hereinafter.

BACKGROUND OF THE INVENTION

This invention relates generally to inflatable restraint systems and, more particularly, to the generation of inflation gas used in such systems.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior.

Various types or forms of such passive restraint assemblies have been developed or tailored to provide desired vehicle occupant protection such as based on either or both the position or placement of the occupant within the vehicle and the direction or nature of the vehicle collision, for example. In particular, driver side and passenger side inflatable restraint installations have found wide usage for providing protection to drivers and front seat passengers, respectively, in the event of head-on types of vehicular collisions. Further, side impact inflatable restraint installations have been developed to provide improved occupant protection against vehicular impacts inflicted or imposed from directions other than head-on, i.e., "side impacts."

In addition to an airbag cushion, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion. Many types or forms of inflator devices have been disclosed in the art for use in inflating an inflatable restraint system airbag cushion.

"Rise rate", i.e., the rate at which the gas output from an inflator increases pressure, as measured when such gas output is directed into a closed volume, is a common performance parameter used in the design, selection and evaluation of inflator devices for particular vehicular airbag restraint system installations. It is commonly desired that an inflatable restraint airbag cushion initially inflate in a relatively gradual manner soon followed by the passage of inflation gas into the airbag cushion at a relatively greater or increased pressure rate. An inflator resulting in such inflation characteristics is commonly referred to in the field as producing inflation gas in accordance with an "S" curve.

One particularly common type or form of inflator device used in inflatable passive restraint systems is commonly referred to as a pyrotechnic inflator. In such inflator devices, gas used in the inflation of an associated inflatable element is derived from the combustion of a pyrotechnic gas generating material. A variety of combustible pyrotechnic materials have been developed for use in the inflation of automotive inflatable restraint airbag cushions.

Another common form or type of inflator device utilizes or relies on a stored compressed gas. The term "compressed gas inflator" is commonly used to refer to the various inflators which contain a selected quantity of compressed gas. For example, one particular type of compressed gas inflator, commonly referred to as a "stored gas inflator," simply contains a quantity of a stored compressed gas which is selectively released to inflate an associated airbag cushion.

A second type of compressed gas inflator, commonly referred to as a "hybrid inflator," typically supplies or provides inflation gas as a result of a combination of stored compressed gas with the combustion products resulting from the combustion of a gas generating material, e.g., a pyrotechnic.

In the past, compressed gas inflators of various types have commonly been at a disadvantage, as compared to pyrotechnic inflators, in terms of size, weight and/or cost. This is especially significant in view of the general design direction toward relatively small, lightweight and economical modern vehicle components and assemblies. Thus, there is a continuing need and demand for further improved apparatus and techniques for inflating inflatable devices such as inflatable airbag cushions.

At least partially in response to such need and demand, the above-identified related prior U.S. patent application Ser. No. 09/495,975 discloses an improved apparatus for inflating an inflatable device wherein one or more apparatus parameters such as weight, cost, complexity, and size, for example, can desirably be reduced or minimized to a greater extent than otherwise or previously possible or realizable while providing required or desired performance capabilities. This prior patent application discloses an apparatus which includes a first chamber having contents which include at least one gas source material, e.g., nitrous oxide, which upon initiation undergoes dissociation to form dissociation products used to inflate the inflatable device. In accordance with the invention thereof, the apparatus is improved through the inclusion of at least one unreactive dissociation reaction modifier selected from a group consisting of $CO_2$, $Xe$, $SF_6$ and mixtures thereof. Such at least one unreactive dissociation reaction modifier is stored at least partially in liquefied form in fluid contact with the at least one gas source material in the first chamber. In accordance with a preferred embodiment of the invention, the at least one unreactive dissociation reaction modifier is effective to moderate at least one of the temperature and concentration of the at least one gas source material in the first chamber upon the dissociation of at least a portion of the at least one gas source material.

While such an inflator apparatus can successfully overcome, at least in part, some of the problems associated with prior types of inflator devices, such inflator apparatus and the operation thereof may be subject to certain limitations or complications. For example, operation of such an inflator apparatus having a high concentration of nitrous oxide stored therein, e.g., greater than about 50 molar percent nitrous oxide, can result in the formation of problematic amounts or concentrations of undesirable oxides of nitrogen ($NO_x$), such as NO and $NO_2$.

As a result, there is a continuing need and demand for further improvements in safety, simplicity, effectiveness, economy and reliability in the apparatus and techniques used for inflating an inflatable device such as an airbag cushion. In particular, there is a need and a demand for an improved inflator apparatus of reduced size and associated methods of operation which also desirably eliminate, avoid or minimize certain problems or complications such as associated with $NO_x$ formation.

SUMMARY OF THE INVENTION

A general object of the invention is to provide an improved apparatus and corresponding or associated method for inflating an inflatable device.

A more specific objective of the invention is to overcome one or more of the problems described above.

The general object of the invention can be attained, at least in part, through an improved apparatus for inflating an inflatable device. The inflation apparatus is of a type wherein a gas generant reactant reacts with oxygen to produce a gaseous inflation medium. The apparatus includes a closed first chamber having contents free of nitrous oxide and which contents include a supply of oxygen. The apparatus also includes an initiator to initiate reaction of at least a fraction of the supply of oxygen with the gas generant reactant to produce a quantity of the gaseous inflation medium. In accordance with a first preferred embodiment of the invention, the apparatus is improved through the inclusion of at least one unreactive reaction modifier selected from a group consisting of $CO_2$, Xe, $SF_6$ and mixtures thereof. In accordance with certain preferred embodiments, such at least one unreactive reaction modifier is desirably stored at least partially in liquefied form in fluid contact with at least a portion of the supply of oxygen in the first chamber.

The prior art generally fails to provide an inflation apparatus and techniques for inflating an inflatable device which desirably reduce or minimize the envelope required thereby to as great an extent as may be desired while, at the same time reducing or minimizing the amounts or concentrations of undesirable oxides of nitrogen ($NO_x$), such as NO and $NO_2$, resulting therefrom.

The invention further comprehends a method for inflating an inflatable safety device in a vehicle. In accordance with one preferred embodiment of the invention, such method includes:

releasing oxygen from a chamber having contents free of nitrous oxide and including a supply of oxygen and a quantity of at least one unreactive reaction modifier selected from a group consisting of $CO_2$, Xe, $SF_6$ and mixtures thereof and reacting a gas generant material with at least a portion of the oxygen from the chamber to produce a quantity of gaseous inflation medium.

In accordance with certain preferred embodiments, at least a portion of the quantity of at least one unreactive reaction modifier is desirably stored at least partially in liquefied form in fluid contact with at least a portion of the supply of oxygen.

"Equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi=(F/O)_A/(F/O)_S \qquad (1)$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

As used herein, references to a material as "under-oxidized," "oxygen-deficient" or the like are to be understood to refer to a material having an equivalence ratio which is less than one.

Other objects and advantages will be apparent to those skilled in the art from the following detailed description taken in conjunction with the appended claims and drawings.

BRIEF DESCRIPTION OF THE DRAWINGS

FIG. 2 illustrates the airbag inflator in a normal or a "static" state.

FIG. 3 illustrates the airbag inflator shown in FIG. 2 but now at an intermediate point in operation prior to the discharge of inflation gas therefrom.

FIG. 4 illustrates the airbag inflator shown in FIG. 3 at a later still point in the operation thereof.

DETAILED DESCRIPTION OF THE INVENTION

Figure 1:
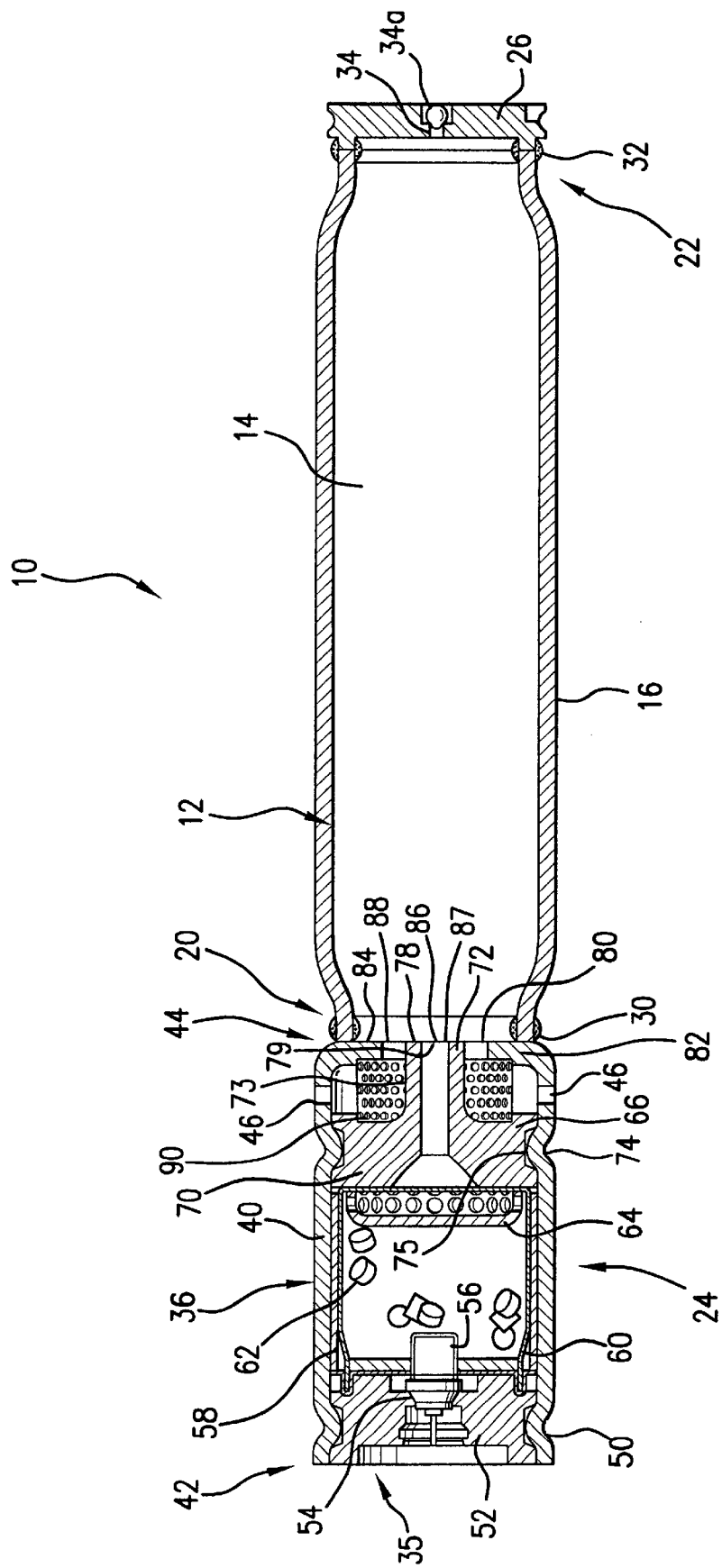
FIG. 1 is a partially in section, schematic drawing of an airbag inflator in accordance with one preferred embodiment of the invention.

The present invention may be embodied in a variety of different structures. As representative, FIG. 1 illustrates the present invention as embodied in an apparatus, generally designated by the reference numeral 10, in accordance with one embodiment of the invention. Such a gas producing or supplying device can advantageously be used to effect the inflation of an inflatable device such as an inflatable vehicle occupant restraint, e.g., an inflatable airbag cushion, (not shown). As described above, such a gas producing or supplying device is commonly referred to as an inflator.

While the invention is described below with particular reference to a passenger side airbag inflator apparatus such as can be used in association with various automotive vehicles including vans, pick-up trucks, and particularly automobiles, it is to be understood that the invention also has applicability not only with other types or kinds of vehicles including, for example, airplanes, and other types or kinds of airbag inflator apparatus for automotive vehicles including, for example, driver side and side impact airbag assemblies but also for the inflation of various inflatable devices such as may be apparent to those skilled in the art. With respect to automotive vehicles it will also be appreciated that due to usual physical differences between passenger, side impact and driver side airbag module assemblies, including the typical difference in size with passenger side airbags generally being much larger than those used in side impact and driver side assemblies, the invention may have particular initial utility in passenger side airbag inflator apparatus.

Returning to FIG. 1, the inflator apparatus 10 includes a closed first or storage chamber 12 that is filled and pressurized with contents, designated by the reference numeral 14, generally useful in the provision of a gaseous inflation medium such as may be used in the inflation of an associated inflatable device, as described in greater detail below. In accordance with a preferred embodiment of the invention, the chamber contents 14 include a supply of oxygen and a quantity of at least one unreactive reaction modifier, as described in greater detail below.

As those skilled in the art and guided by the teachings herein provided will appreciate the handling, manufacture and storage of pure (100%) oxygen can present a serious and, under at least certain circumstances, unacceptable safety hazard. In addition, the release of 100% oxygen and its associated oxidizing capability into a vehicle interior can present significant concerns, particularly in the event of a vehicle fire.

Further, the use of 100% or otherwise undiluted oxygen in ensuing combustion reaction processing as commonly occurs in typical inflatable restraint systems inflator devices can result in a too rapid of reaction with the associated gas generant reactant. As will be appreciated by those skilled in the art and guided by the teachings herein provided, high rise rates are typically associated with inflators which experience such a rapid reaction. For the reasons discussed above, high rise rate inflators may be undesired for various inflatable restraint applications.

Also, such rapid reaction can lead to dramatic or otherwise significant pressure increases within the inflator device or other inflatable restraint installation component such as to require special designs or constructions. In particular, the need to provide for relatively higher pressure capabilities in the design of inflator devices typically results in the need for thick-walled pressure vessels that tend to be more bulky, heavy and costly than otherwise desired.

Each of such supply of oxygen and quantity of at least one unreactive reaction modifier is preferably in the nature of a compressed gas or a compressed gas mixture. Such compressed gases can be stored in gaseous, liquid or multi-phase form (i.e., partially gaseous and partially liquid mixture). As will be appreciated, the premium on size generally placed on modern vehicle design, generally results in a preference for smaller sized airbag inflators. In view thereof and the fact that the densities for such compressed gas materials are significantly greater when in a liquid, rather than gaseous form, storage of such compressed gas materials at least partially in a liquid form will typically be preferred. In view of the above, the first chamber 12 is sometimes referred to herein as a gas/liquid storage chamber or as simply a storage chamber.

As detailed below, it has been found generally desirable to limit or otherwise control the concentration of oxygen within the chamber 12 through the inclusion of a quantity of at least one unreactive reaction modifier. Further, such quantity of at least one unreactive reaction modifier is preferably stored at least partially in liquefied form in fluid contact with the oxygen in the chamber 12.

Those skilled in the art and guided by the teachings herein provided will appreciate that various unreactive reaction modifiers can be used in accordance with the invention. Preferred reaction modifiers for use in the practice of the invention are desirably unreactive in the reaction between the gas generant reactant with oxygen. That is, while the reaction modifier desirably influences, i.e., slows, the rate of reaction (e.g., combustion), the reaction modifier preferably does not itself participate in the reactions occurring with the chamber. In particular, preferred reaction modifiers in accordance with the invention will not degrade or otherwise react when exposed to anticipated inflator environments.

A general characteristic of matter in a liquid phase is that such phase results in or provides a relatively greater density as compared to the corresponding gaseous phase, at an equivalent temperature. Thus, through the incorporation of matter in a liquid phase, the mass of matter held or contained within a given volume can be advantageously increased. As will be appreciated by those skilled in the art and guided by the teachings herein provided, significant size reductions can be realized as a result of the increase in density afforded by storing or containing materials in liquid, as compared to gaseous, form. Moreover, through such utilization of the liquid phase of matter, such an increase in mass can be realized even given operation at higher (e.g., supercritical) pressures and temperatures. It will be appreciated by those skilled in the art that under certain conditions, particularly elevated temperatures (roughly 35° C. and greater) the fluid stored within the inflator may be considered supercritical, e.g., meaning a gas/liquid phase transition may no longer occur. At the same time, it should be clear that the capability to increase the mass held within the inflator can be understood knowing the relationship of gas and liquid components at room temperature (e.g., 21° C.) as well as understanding the subsequent expansion characteristics of these mixtures.

Thus, preferred reaction modifiers for use in the practice of the invention are desirably conducive to liquefaction at the temperatures typically associated with airbag inflatable restraint operation. For example, airbag inflators are typically or usually designed to provide or result in desired operation over a temperature range of about −40° C. to about 110° C. Thus, the incorporation and use of reaction modifiers conducive to liquefaction at such temperatures is generally preferred.

In view of the above, preferred reaction modifiers for use in the practice of the invention can desirably be selected from the group consisting of $CO_2$, Xe, $SF_6$ and mixtures thereof. A particularly preferred reaction modifier for use in the practice of the invention is carbon dioxide.

Those skilled in the art and guided by the teachings herein provided will appreciate that carbon dioxide provides or exhibits a number of qualities or characteristics which make such use thereof particularly attractive.

First, carbon dioxide can be relatively easily liquefied. For example, carbon dioxide can be liquefied at ambient temperature at relatively low pressures. Since the density of liquid phase carbon dioxide is significantly greater than the corresponding gaseous phase, the mass of material storable within a given volume is significantly greater for the liquid, as compared to the gaseous form. As a result, corresponding inflator devices which have a significantly reduced envelope can be used.

Another advantageous feature of carbon dioxide is that it is relatively inexpensive, for example, as compared to xenon. Further, while carbon dioxide is not a chemically inert gas, it has been found that in the practice of the invention the dissociation of carbon dioxide into carbon monoxide can be desirably minimized. This is especially significant as the production of carbon monoxide is typically of concern with when using carbon dioxide-based or containing mixtures.

Further, the storage pressure useable with such oxygen-carbon dioxide mixtures or combinations is relatively low, when compared to typical inert gas mixtures. As will be appreciated, the use of lower storage pressures, such as realizable with the subject fluid mixtures can advantageously relieve the structural requirements for the vessel and, as a result, a vessel of lighter weight design can be used.

While the chamber 12 need not contain materials other than oxygen and at least one unreactive reaction modifier (e.g., in accordance with one preferred embodiment, the chamber contents include no more than minor levels of other materials, such as air as may be present in the chamber prior to being filled with oxygen and the reaction modifier and, in particular, the contents 14 of the chamber 12 is free of nitrous oxide), the chamber may, if desired, additionally contain at least certain other materials, as described below. For example, an inert gas such as helium can be included as a part of the chamber contents to facilitate leak checking of the inflator apparatus or, more specifically, of the chamber 12. Generally speaking and dependent on the particular application, the concentration of a leak trace material such as helium, if used, will in practice typically be in the range of about 2 to about 20 molar percent and, more typically, be in a range of about 5 to about 10 molar percent. It is to be understood, however, that as helium does not generally liquefy under the conditions here of interest, the inclusion thereof can detrimentally significantly increase the fluid storage pressures associated with the resulting assemblies.

In practice, the chamber 12 content of oxygen is preferably in the range of about 5 to about 95 molar percent, more preferably the chamber 12 content of oxygen is in the range of about 5 to about 50 molar percent and, even more preferably, the chamber 12 content of oxygen is in the range of about 10 to about 30 molar percent. Further, the chamber 12 content of reaction modifier is preferably in the range of about 5 to about 95 molar percent, more preferably the chamber 12 content of reaction modifier is in the range of about 45 to about 95 molar percent and, even more preferably, the chamber 12 content of reaction modifier is in the range of about 60 to about 90 molar percent. Operation within such ranges has been found to generally result in suitable inflator performance for inflatable restraint system applications. In particular, such operation can provide or result in desired safety and a desired rate of reaction with the associated supply of gas generant reactant. In particular, operation such as at the most preferred oxygen concentrations identified above has been found to desirably result in 1) oxidation of a significant amount of the gas generant material, 2) a resulting oxygen concentration in the exit gases which is not too high (e.g., generally less than 30 percent and, preferably, less than 20 percent), and 3) a reduction or minimization of manufacturing concerns.

For example, the presence or inclusion of oxygen at relatively high concentrations can generally result in the generation of significantly high pressures within the associated vessel. In practice, pressure vessels required to be able to withstand such high pressures must generally be made with increased structural strength, such as by being made with walls of increased thickness. However, increasing the thickness of such vessel walls generally undesirably increases the weight of the associated vessel.

Further, the inclusion or presence of oxygen at relatively high concentrations can also result in increased gas exit temperatures from the vessel. For example, ill-conceived or ill-controlled reaction of high concentration oxygen with generant can result in undesirably high gas exit temperatures. As those skilled in the art will appreciate, various precautions may be desired or required in or with inflation assemblies and methods which produce higher temperature gases. For example, gas treatment assemblies such as cooling screens or the like may need to be included or used in conjunction therewith. The need for inclusion or presence of such added features can undesirably impact apparatus parameters such as cost, weight and size, for example.

In accordance with a preferred practice of the invention, the use of unreactive reaction modifiers, such as described herein, is distinct and different from the use of inert gases such as argon, for example. In particular, while the inclusion of an inert gas such as argon can desirably serve to reduce the concentration of oxygen and thus act to moderate the reaction occurring with an associated supply of gas generant reactant, the inclusion, use or reliance on such an inert material can present or result in significant size and pressure limitations and restrictions. In particular, the storage pressure of such a gas mixture is generally significantly greater than that associated with a liquid of partially liquified mixture as desirably realized through the practice of the invention. Conversely, a significantly greater mass of a liquefied mixture can be held in a given volume at a set pressure, as compared to a corresponding ideal gas mixture, e.g., the density of such liquified gas is greater than that of an ideal gas. This allows the use of smaller sized inflators, as may be desired by automobile designers. Further, smaller sized inflators may generally have lower material costs associated therewith such as to reduce the cost of the inflator device. Still further, the use of a liquid is different due to the fact that a liquified gas, which in accordance with the invention is desirably subsequently vaporized, is present. The latent beat associated with such vaporization can in practice represent a significant amount of energy. Thus, the use of a liquefied gas introduces additional physical effects into the inflation phenomena.

Returning to FIG. 1, the chamber 12 is defined by an elongated generally cylindrical sleeve 16, such as desirably in the form of an open ended seamless tube. The sleeve 16 includes opposite first and second open ends, 20 and 22, respectively. An assembly, herein denominated a "diffuser assembly", generally designated by the reference numeral 24, is formed or appropriately joined or attached to the sleeve first end 20. A second end closure 26 is formed or appropriately joined or attached to the sleeve second end 22. For example and as shown in FIG. 1, the first sleeve end 20 can be swagged and the diffuser assembly 24 joined thereto such as by means of an inertial weld 30. Similarly, the second sleeve end 22 can be swagged and the second end closure 26 joined thereto such as by means of an inertial weld 32.

The second end closure 26 includes a fill port 34, as is known in the art, wherethrough materials can be passed into the chamber 12. After the storage chamber 12 has been filled, the fill port 34 can be appropriately blocked or plugged, as is known, such as by a pin or ball 34a. As will be appreciated, such a fill port, if included in the inflator apparatus, can alternatively be placed or positioned, as may be desired and understood by those skilled in the art. Thus, the broader practice of the invention is not necessarily limited to the inclusion of a fill port or the position or placement thereof.

The diffuser assembly 24 is a multi-component assembly such as may, at least in part, serve as, contain or hold a chamber opener 35, such as described in greater detail below and such as, in accordance with one preferred embodiment, actuatable to produce a discharge effective to open the first chamber 12 by non-mechanical means, i.e., a discharge effective to open the first chamber 12 without necessitating the use of or reliance on mechanical opening devices such as projectiles or piston members, for example. In particular embodiments of the invention, such a discharge may be or take the form of a shock wave or other pressure disturbance, a hot product gas or other elevated temperature discharge or various combinations thereof, for example and as will be appreciated by those skilled in the art and guided by the teachings herein provided.

More specifically, the diffuser assembly 24 includes a housing 36 such as in the general form of a hollow tube side wall 40 having open first and second ends, 42 and 44, respectively. The side wall 40 includes a plurality of exit ports 46, wherethrough the inflation gas from the inflator 10 and, particularly the diffuser assembly 24, is properly dispensed into an associated airbag cushion (not shown). Thus, the diffuser assembly 24 can serve to facilitate direction and ballistic control of the inflation fluid from the inflator 10 into the associated inflatable airbag cushion. As will be appreciated by those skilled in the art, the number and positioning of placement of the exit ports can be selected to provide particular inflation performance characteristics required or desired in or of a particular inflator installation. In practice, four generally evenly circumferentially spaced exit ports have been found sufficient to generally provide a sufficiently even flow control of the inflation medium, from the inflator into an associated airbag cushion and such as may facilitate the desired inflation thereof To the housing first end 42, there is fitted or attached, such as by means of a crimp 50, a first end closure 52. The first end closure 52 includes an opening 54 therein wherethrough an initiator device 56 such as forms, at least in part, a portion of the chamber opener 35, is appropriately attached. Particular initiator devices for use in the practice of the invention can include any suitable type of initiator means including: bridgewire, spark-discharge, heated or exploding wire or foil, through bulkhead (e.g., an initiator which discharges through a bulkhead such as in the form of a metal hermetic seal), for example, and may, if desired, optionally contain a desired load of a suitable pyrotechnic charge.

The diffuser assembly 24 further includes, such as a part of the chamber opener 35, a combustion chamber 58 wherein there is contained a generant canister 60. The generant canister 60 may advantageously be situated adjacent the first end closure 52 and particularly the initiator device 56, such as to facilitate the direct communication therewith by the initiator device 56 upon the actuation thereof. Such a generant canister 60 can desirably be formed of a metal, such as steel, copper, brass, aluminum or the like, for example. Further, such metal material of construction may, if desired, include a suitable coating such as to provide increased corrosion resistance, for example. In accordance with one preferred embodiment of the invention, a generant canister formed of steel with a tin coating has been found desirable and useful.

Within the generant canister 60 there is housed a charge, quantity or supply of a selected gas generant reactant material, such as represented by the solid pyrotechnic gas generant pellets, generally designated by the reference numeral 62. Gas generant reactants for use in the practice of the invention can suitably take various forms including wafer, pellet and grain forms, for example. As described in greater detail below, in accordance with one preferred embodiment of the invention, the reactable gas generant material is reacted to form reaction products effective to rupture the generant canister and, upon fluid communication with the chamber contents 14, result in either or both the reaction of additional of the gas generant reactant with oxygen of the chamber 12 or the further or more complete reaction of partially reacted gas generant material such as to form an inflation medium for the inflation of an associated airbag cushion.

Various gas generant reactant materials, such as known in the art, can be used in the practice of the invention. In accordance with the broader practice of the invention, suitable gas generant reactant materials can be over-oxidized, under-oxidized (e.g., oxygen-deficient) or a stoichiometric combination of fuel and oxidant. However, as described in greater detail below, in a preferred embodiment of the invention, oxygen contained or included in the chamber 12 desirably participates in the reaction of the gas generant material and the resulting production or formation of inflation fluid associated with such reaction. Thus, in such a preferred embodiment, the gas generant reactant is desirably an under-oxidized, e.g., oxygen-deficient, material.

In accordance with a preferred embodiment of the invention, gas generant reactant materials having the form of a solid, and such as may desirably reduce or minimize various manufacturing concerns, are used. Many solid fuels are suitable for use in the practice of the invention including polyolefins, waxes, and internally partially oxidized compounds such as polyesters, polyethers, acrylic polymers, phenols, polysaccharides (cellulose or starch), cellulose ethers, cellulose esters, nitrate salts of amines, nitramines, nitrocompounds, and mixtures of two or more of such components. More specifically, suitable solid fuel gas generant reactants are exemplified by ethyl cellulose, cellulose acetate, cellulose acetate butyrate, cellulose propionate, polyacetal, polyethylene, polypropylene, polystyrene, hydroxy-terminated polybutadiene, polymethylacrylate, naphthalene, nitrocellulose, as well as various combinations thereof.

Further, catalysts and burn rate modifiers, such as known to those in the art, can, if desired, be included in or with such fuel material gas reactants. Suitable such materials may include boron hydrides and metal oxides such as copper oxide, for example.

A particularly advantageous family of gas generant reactants which can beneficially be used in the practice of the invention is the well-known LOVA (low vulnerability ammunition) gun propellants. As will be known to those skilled in the art, many different specific formulations for different propellants of the LOVA type or family exist. For example, suitable LOVA propellants may include roughly 76 weight percent cyclonite (RDX), 23 weight percent CAB (cellulose acetate butyrate), and a balance of inert or active binders such as nitrocellulose, polyvinyl nitrate and polynitropolyphenylene, for example.

Returning to FIG. 1, while the utilization and inclusion of such a gas generant canister or housing 60 can facilitate inflator assembly and handling during processing, it is to be understood that the broader practice of the invention is not necessarily so limited. For example, the invention can, if desired, be practiced using an inflator wherein a selected gas generant material is directly or otherwise appropriately placed and contained within an associated diffuser housing.

The diffuser assembly 24 may, as shown, also include a combustion screen 64 or the like such as to screen or otherwise separate and desirably remove larger sized particulate material such as may form upon reaction of the reactable gas generant material. If included, such a combustion screen can be contained within the generant canister 60, as shown. Alternatively, such a combustion screen can be included within such a diffuser assembly externally adjacent the gas generant canister or otherwise downstream of the gas generant material.

The diffuser assembly 24 further includes, such as adjacently positioned relative to the generant canister 60, a flow control element 66. In this illustrated embodiment, the flow control element 66 includes a base portion 70, a neck portion 72 and forms a fluid flow conduit 73, such as in the form of a nozzle. In the illustrated embodiment, the flow control element 66 is secured within the diffuser assembly 24 by means of a crimp 74 formed by the diffuser housing 36 adjacent the flow control element base portion 70. In particular, the flow control element base portion 70 forms an indentation 75 along the outer wall 76 thereof. The indentation 75 is adapted to receive or otherwise cooperate with the diffuser housing crimp 74 such as to desirably secure the flow control element 66 within the diffuser assembly 24 in a non-movable manner.

In the particularly illustrated embodiment, the fluid flow conduit 73 is in the form of a nozzle having a discharge end 78 forming or having a discharge opening 79 wherethrough at least a portion of the discharge from the chamber opener 35, e.g., reaction products formed upon reaction of the reactable gas generant material 62 are desirably directed and transmitted into chamber-opening communication with the first chamber 12 and, in turn, communication with the contents 14 contained therewithin.

The first chamber 12 is enclosed at the sleeve first end 20 by means of a burst disk 80. As shown in FIG. 1, the housing second end 44 includes or has formed thereat a rupture disk support collar 82 whereto the burst disk 80 can desirably be sealed around the perimeter region thereof, generally designated by the reference numeral 84, such as to desirably provide a leak-free seal for the contents 14 normally contained or stored within the chamber 12. The burst disk 80, at a center portion 86 thereof, is desirably supported at least in part by the flow conduit discharge end 78.

In practice, the burst disk 80 is typically in the form of a thin disk such as fabricated or formed of a metal material such as Inconel 600 or Inconel 625. In practice, such a disk may typically have a thickness in the range of about 0.005 inch (0.127 mm) to about 0.010 inch (0.254 mm), for example.

It is to be understood that a disk support arrangement such as described above can advantageously result in the use of a burst disk of reduced thickness as compared to similar arrangements but wherein the associated disk lacks such support features. As will be appreciated, the use of a disk of reduced thickness can facilitate the desired rupture or opening of the disk, as described in greater detail below.

Under high pressure proof testing such as pressures in the range of about 4500 psi (31.0 MPa) to about 6000 psi (41.4 MPa), the disk 80 deforms against the support provided by the flow conduit discharge end 78 such as to provide or result in a first sealing portion 87. Such burst disk deformation desirably results in the disk 80 seating tightly against the flow conduit discharge end 78. Such tight seating of the disk 80 against the flow conduit discharge end 78 has been found to favorably influence the direct opening of the burst disk 80 such as via the impingement thereon of the reaction products produced by or resulting from the chamber opener 35, such upon the reaction of the gas generant material 62 contained within the diffuser assembly 24. In particular, such tight seating has in practice been found reliably sufficient whereby the direct physical joining of the burst disk to the flow conduit discharge end such as by means of an additional weld joinder is generally not required in order for the assembly to reliably result in the gas generant reaction products to be directed into the chamber 12 rather than, for example, flowing directly out of the diffuser assembly 24 such as via the exit ports 46 without first entering into the chamber 12. The avoidance of the need for an additional weld joinder at the center portion 86 simplifies and reduces manufacturing costs and can beneficially affect reliability associated with the manufacture and operation of the resulting inflator apparatus. It is to be understood, however, that the burst disk can, if desired, be joined or attached with or to the nozzle such as by being welded, brazed or bonded thereto, for example.

The disk 80 also deforms against the support provided by the support collar 82 and, as identified above, can be sealed around the perimeter region of disk such as to provide or result in a second sealing portion 88.

It will be appreciated that the burst disk can, if desired, include a score or the like feature (not shown) such as appropriately located or situated at the center portion 86 to facilitate the desired opening of the burst disk. More specifically, the inclusion of such a score can be helpful in more specifically locating or positioning the site at which the burst disk 80 will initially open upon the direction of the gas generant reaction products from the fluid flow conduit 73 thereagainst.

As will be appreciated, such burst disk scoring can take various forms such as known in the art. For example, such a burst disk may include a score in the form of a cross or a circle, such as may be desired or particularly suited for a specific installation. Further, such a score may take the form of an indentation, marking or otherwise reduction in the thickness of the burst disk at selected area or portion thereof, as is known in the art.

If desired and as shown, the diffuser assembly 24 additionally includes a filter 90 interposed between the burst disk 80 and the exit ports 46. As will be appreciated, the inclusion of such a filter may be desired or helpful in removing undesired particulates and the like from the inflation gas prior to passage out of the inflator 10, through the exit ports 46.

Figure 2:
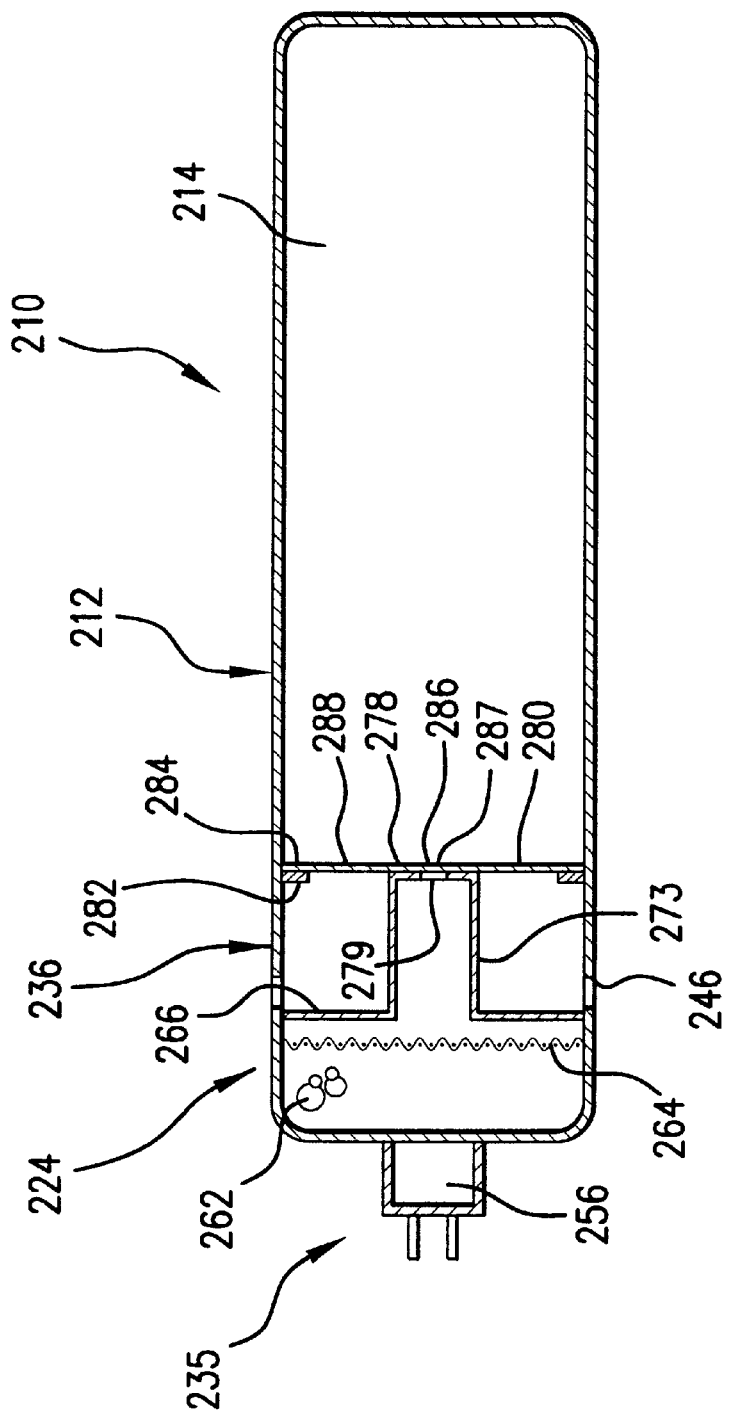
FIGS. 2–4 are simplified, partially in section, schematic drawings illustrating sequential operation of an airbag inflator in accordance with one embodiment of the invention. More specifically.
Figure 3:
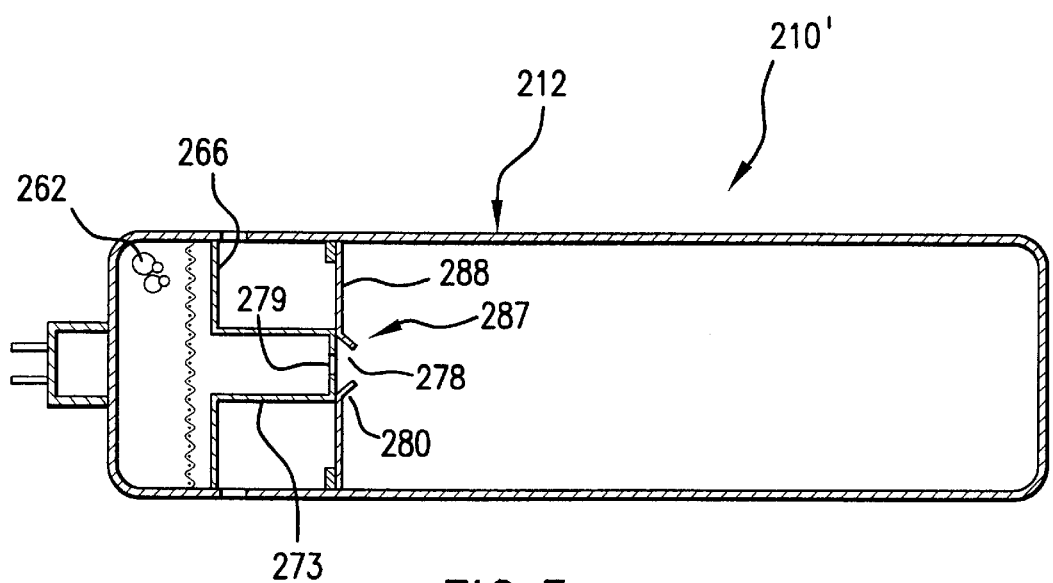
Figure 4:
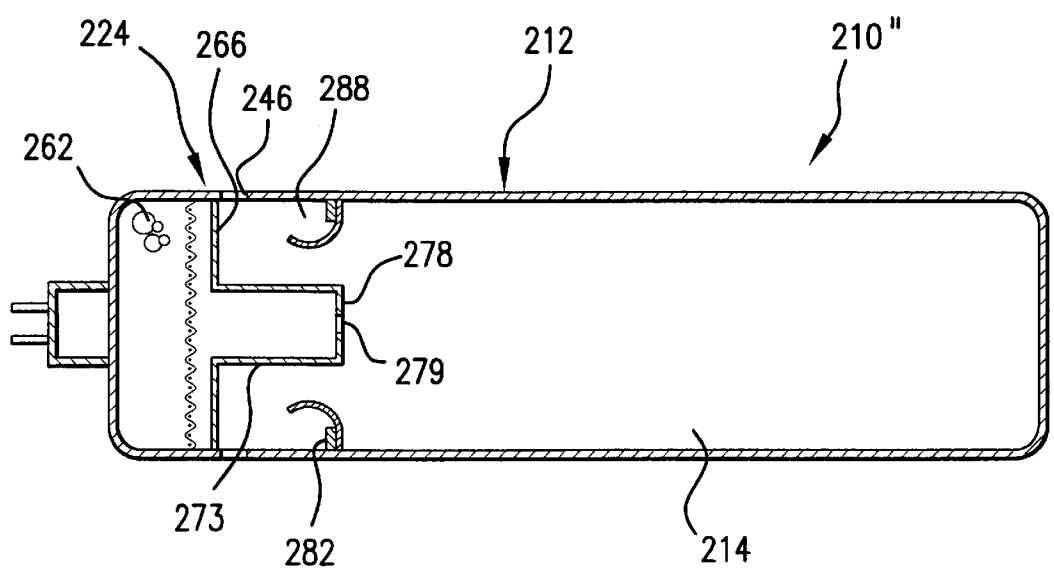

The manner of operation of an inflator apparatus in accordance with the invention will now be described in greater detail making reference to FIGS. 2–4. More specifically, FIGS. 2–4 schematically illustrate an inflator apparatus in accordance with one preferred embodiment of the invention at various selected points in the operation process thereof. In particular, FIG. 2 illustrates the inflator apparatus 210 in a "static" or what may be termed its normal state, similar to that shown in FIG. 1. FIG. 3 illustrates the same inflator apparatus (now designated 210') at an intermediate point in operation subsequent to actuation and prior to the discharge of inflation gas therefrom. FIG. 4 illustrates the same inflator apparatus (now designated by the reference numeral 210") at a subsequent or still later point in the operation thereof.

The inflator apparatus 210, as shown in FIG. 2, is generally the same as the inflator apparatus 10 shown in FIG. 1 and described above. For example, the inflator apparatus 210 includes a first chamber 212 filled and pressurized with a content mixture 214, such as in a form including an at least partially liquefied combination of a quantity of at least one selected unreactive reaction modifier, such as carbon dioxide, for example, and a supply of oxygen. The inflator apparatus 210 also includes a diffuser assembly 224 adjacent the first chamber 212.

The diffuser assembly 224 includes a housing 236 having plurality of exit ports 246, a chamber opener 235, such as at least in part in the form of an initiator device 256, a quantity or supply of a selected reactable gas generant material 262, a combustion screen 264, a flow control element 266 such as includes a fluid flow conduit 273 such as in the form of a nozzle and having a discharge end 278 forming or having a discharge opening 279 wherethrough reaction products formed upon reaction of the reactable gas generant material are desirably directed and transmitted into communication with the first chamber 212 and a burst disk 280. As shown, a rupture disk support collar 282 desirably provides support to a perimeter region 284 of the burst disk 280.

As described above relative to the embodiment illustrated in FIG. 1, the burst disk 280, at a center portion 286 thereof, is desirably supported by the flow conduit discharge end 279. Further, the burst disk 280 in cooperation with the flow conduit 273 forms a first sealing portion 287. Also, the disk support collar 282 provides a base to which the burst disk 280 can desirably be sealed such as to provide a leak-free seal for the expandable fluid normally contained or stored within the chamber 212. Further, the burst disk 280 in association with the support collar 282 forms a second sealing portion 288.

As will be appreciated, in FIGS. 2–4, certain simplifications have been made to simplify illustration and discussion. For example, FIGS. 2–4 do not illustrate the inclusion of various welds or crimps such as may desirably be utilized in the joining together of the component parts of the inflator device. Further, FIGS. 2–4 do not illustrate either the inclusion of a gas generant canister or a filter interposed between the burst disk 280 and the exit ports 246, such as described above relative to the inflator apparatus 10.

Operation

Typical operation of the inflator apparatus 210, shown in FIG. 2, is as follows:

Upon the sensing of a collision, an electrical signal is sent to the chamber opener initiator 256. The initiator 256 functions to at least partially ignite the gas generant material 262. The gas generant material 262 at least partially reacts, e.g., burns, to produce or form gaseous reaction products. The gaseous reaction products are passed through the screen 264, to the flow control element 266 and into the fluid flow conduit 273.

The conduit 273 directs the gas generant reaction products formed by or from the gas generant material 262 at or to the burst disk 280 resulting, as shown in FIG. 3, in the opening of the central portion 287 of the burst disk 280 when the pressure against the burst disk rises to a predetermined level or range. More specifically, the burst disk central portion 287 such as formed or positioned adjacent the flow conduit discharge end 278 and the opening 279 thereat, desirably ruptures or otherwise opens into or towards the first chamber 212.

With the rupture or otherwise opening of the diffuser assembly-supported burst disk central portion 287, the pressure within the first chamber 212 desirably serves to result in initial opening of the burst disk second sealing portion 288. More specifically, the edges of the burst disk second sealing portion 288 desirably petal or otherwise open into or towards the diffuser assembly 224, as shown in FIG. 4.

With such opening of the burst disk second sealing portion 288, a portion of the quantity of unheated contents 214 is released from the first chamber 212. In particular, such released fluid is passed into the diffuser assembly 224 between the flow control element 266 and the disk support collar 282 and ultimately out the exits ports 246 into an associated inflatable vehicle occupant restraint (not shown).

Simultaneously with such opening of the burst disk second sealing portion 288, hot product gases produced upon combustion of the gas generant material 262, flow into the first chamber 212 via the flow conduit 273. As will be appreciated, the combustion products entering into the first chamber 212 must overcome the pressure gradient created by the contents 214 originally contained within the first chamber 212. Based on the teachings and guidance herein provided, conduit or nozzle design parameters such as including the exit area thereof can be selected or determined based on factors such as anticipated storage conditions within the chamber 212.

As described above, the hot gases contact and communicate with the remaining contents of the first chamber 212 resulting in the heating of such fluid and the increasing of the temperature of such fluid. In addition, if the gas generant reactant 262 was under-oxidized or otherwise oxygen-deficient, the hot combustion chamber products may further react with the stored oxygen-containing fluid. The heated fluid and products formed or associated therewith are correspondingly passed or communicated with or through the diffuser assembly 224 and ultimately out the exits ports 246 into the associated inflatable vehicle occupant restraint.

The reaction of many fuel-rich pyrotechnic formulation gas generant materials will produce or create significant quantities of generally undesirably by-products such as hydrogen, carbon monoxide, ammonia and various hydrocarbons. Those skilled in the art and guided by the teachings herein provided will appreciate that through the oxygen-containing environment of the subject inflator apparatus, such products of incomplete combustion can advantageously be more completely or fully oxidized. Thus through the practice of the invention, the release of such generally undesired products into an associated airbag cushion can be prevented or avoided.

Figure 5:
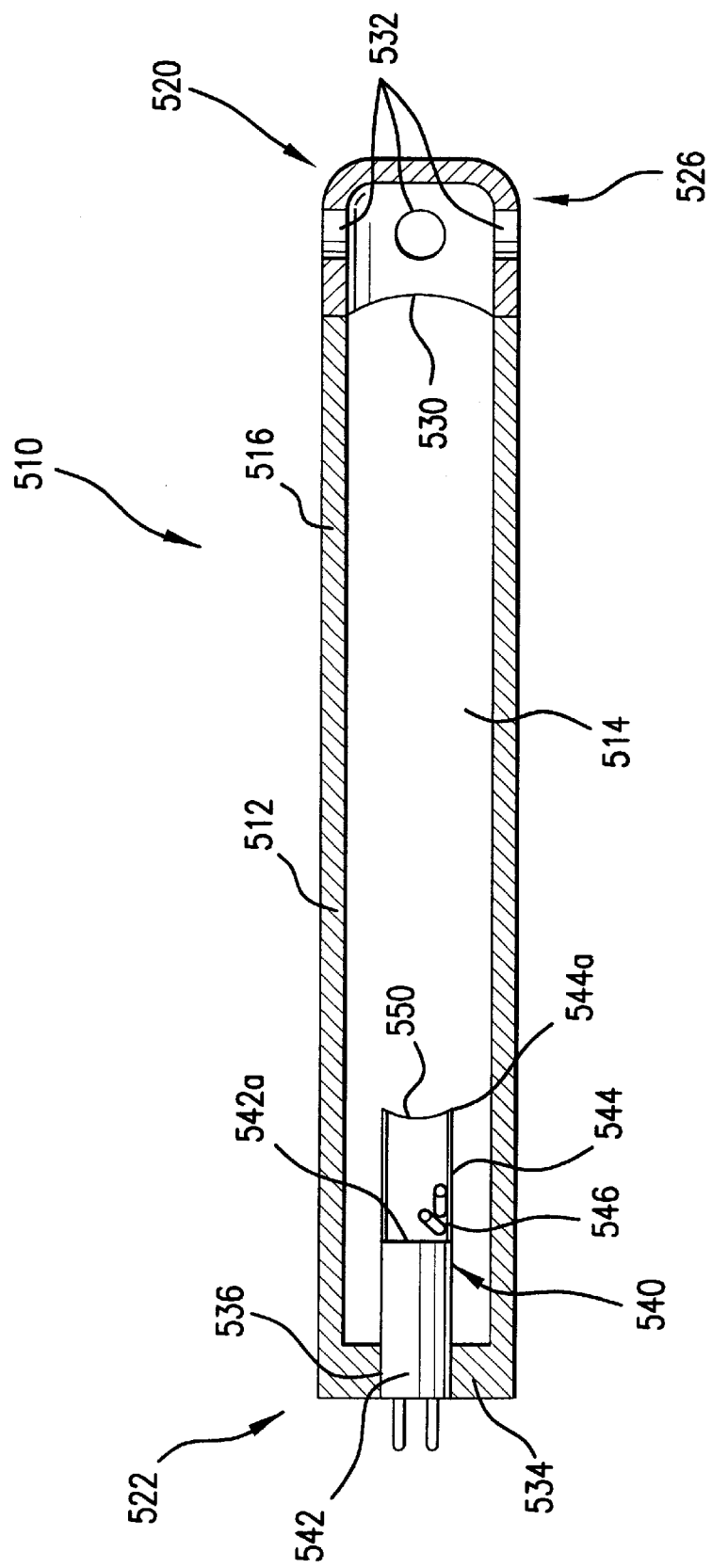
FIG. 5 is a simplified, partially in section, schematic drawing of an airbag inflator in accordance with another embodiment of the invention.

FIG. 5 illustrates an airbag inflator 510 in accordance with an alternative preferred embodiment of the invention. The inflator 510 is in some respects similar to the inflator 10 described above. For example, the inflator 510, similar to the inflator 10, includes a first or storage chamber 512 that is filled and pressurized with contents 514 effective to provide a gaseous inflation medium such as may be used in the inflation of an associated inflatable device and such as described above. In particular, the storage chamber contents 514 may desirably include a supply of oxygen and a quantity of at least one unreactive reaction modifier, e.g., carbon dioxide. As also described above, the storage chamber contents 514 may desirably be stored in at least partially liquefied form such as may desirably reduce or minimize the size associated with such storage chamber.

The storage chamber 512 is defined at least in part by an elongated generally cylindrical sleeve 516 having a first end 520 and a second end 522. The sleeve 516 may include a fill port (not shown), as is known in the art, wherethrough materials can be passed into the chamber 512. The first end 520 is closed by means of a diffuser assembly 526. Such a diffuser assembly can be integral (i.e., formed continuous with and in one piece) with the sleeve 516 or, if desired or preferred, joined or attached thereto in an appropriate manner, such as by an inertial weld.

The storage chamber contents 514 are normally kept separated from the diffuser assembly 526 and contained within the chamber 514 through the inclusion of a selected sealing means, e.g., by means of a burst disk 530 in sealing relationship therebetween. The diffuser assembly 526 includes a plurality of openings 532, wherethrough the inflation gas from the inflator assembly 510 is properly dispensed into an associated occupant restraint airbag cushion (not shown). Thus, the diffuser assembly 526 can serve to facilitate direction of the inflation fluid from the inflator assembly 510 into the associated inflatable vehicle occupant restraint.

The sleeve second end 522 is partially closed by a base wall 534. The base wall 534 includes an opening 536 therein, wherethrough a gas generant reactant heat source 540 is attached in sealing relation within the storage chamber 512. As will be appreciated, such attachment can be effected by various appropriate means such as with a weld, crimp or other suitable hermetic seal, for example.

In accordance with one preferred embodiment of the invention, the heat source 540 is actuatable to be in heat transmitting communication with the contents of the storage chamber 512 to effect contact and subsequent reaction with at least a portion of the supply of oxygen originally therein contained. The heat source 540 includes an initiator device 542, such as described above, and a cup 544 containing a load of a selected gas generant reactant, such as described above.

A representative portion of the gas generant reactant load, designated by the reference numeral 546, is shown. The gas generant load 546 is generally adjacent the discharge end 542a of the initiator device 542 such as in reaction initiation communication with the initiator device 542.

The heat source cup 544 is shown as including a burst disk 550 about the open end 544a thereof. It is to be appreciated that the inclusion of such a burst disk may be desired or needed to ensure hermeticity such as where the heat source may be incapable of withstanding the elevated pressures normally associated with the storage of material within the storage chamber 512 for the extended periods of time that such inflator devices are normally placed in vehicular occupant inflatable restraint systems. It will also be appreciated that other forms or means of separation can, if desired, be utilized including, for example, a retainer in the form of an appropriate foil.

Further, it will be appreciated that the inclusion of such a burst disk 550 or other suitable closure at the open end 544a of the heat source cup 544 will better ensure that the gas generant load 546 of the heat source 544 will remain desirably positioned relative to the initiator discharge end 542a throughout the lifetime of the unactuated inflator assembly.

In operation, such as upon the sensing of a collision, an electrical signal is sent to the initiator device 542. The initiator device 542 functions to initiate reaction of at least a portion of the gas generant load 546 such as to result in the rupture or otherwise opening of the burst disk 550 sealing the heat source cup 544. As will be appreciated such rupture or otherwise opening of the burst disk 550 may result in particularly designed assemblies from either or both an increase of pressure within the cup 544, such as due to the formation of gaseous products upon reaction of the gas generant material, and the direction or discharge of hot particles at the burst disk 550.

With the opening of the cup 544, high temperature combustion products are discharged therefrom into the storage chamber 512. The increase both in temperature and the relative amount of gaseous products within the storage chamber 512 results in a rapid pressure rise therewithin.

When the gas pressure within the storage chamber 512 exceeds the structural capability of the burst disk 530, the disk ruptures or otherwise permits the passage of the inflation gas into the diffuser assembly 526 and subsequently through the openings 532 therein into an associated airbag assembly.

The inflator device 510 thus represents a type of inflator commonly referred to in the art as a "blow down" inflator. As those skilled in the art and guided by the teachings herein provided will appreciate, such blow down inflators are generally very aggressive in terms of rise rate and therefore have found most typical application in side impact airbag inflation applications wherein very aggressive performance is most commonly required or desired.

While the design of the inflator device 510 is relatively simple, it is to be appreciated that in practice such a design may afford little time for the gas generant reactant material to interact and react with the oxygen content originally present within the storage chamber 512. As a result, control of the combustion process in such an inflator device may present a significant practical limitation to more extensive use of such an inflation apparatus.

Figure 6:
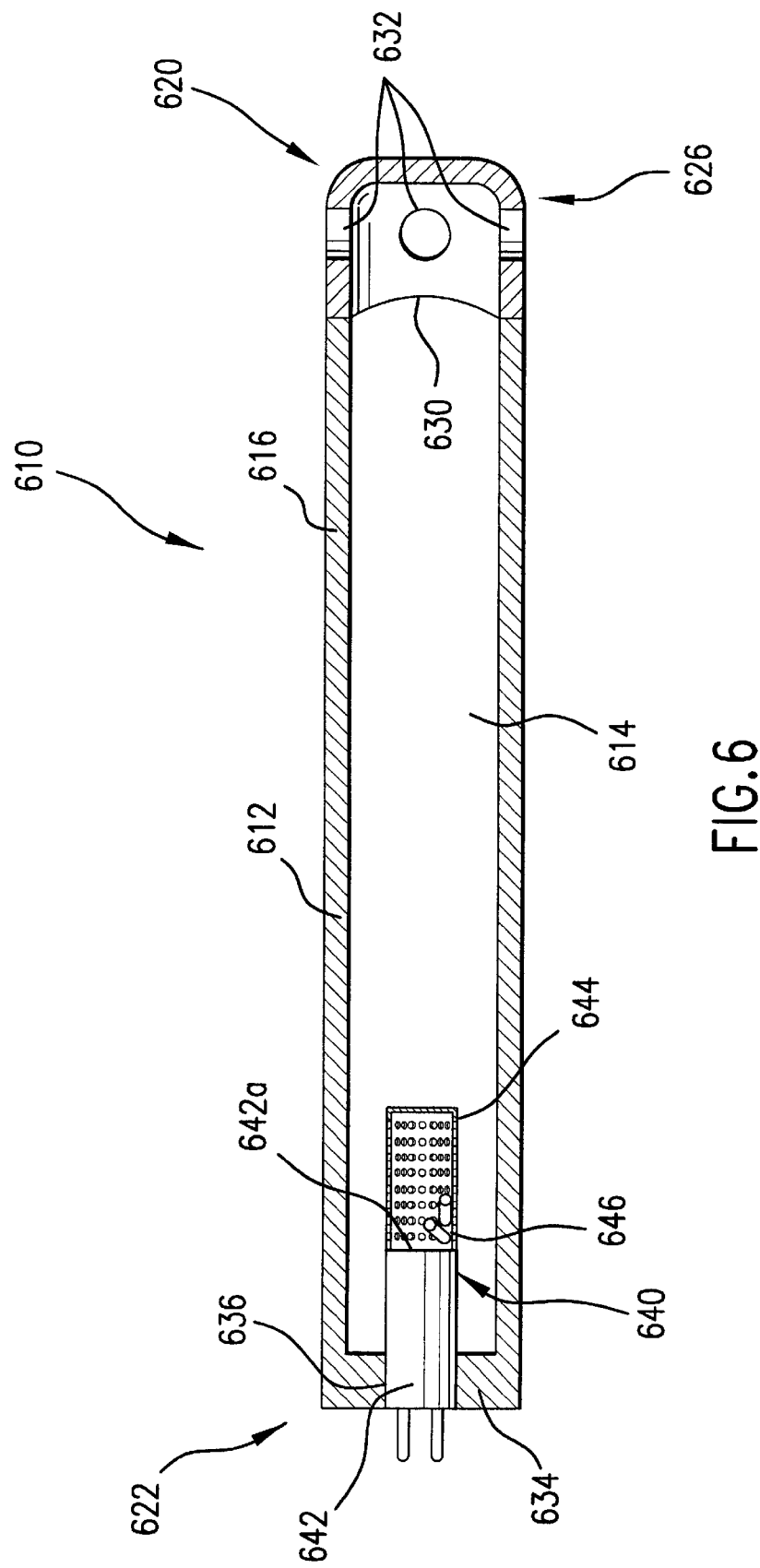
FIG 6 is a simplified, partially in section, schematic drawing of an airbag inflator in accordance with yet another embodiment of the invention.

FIG. 6 illustrates an airbag inflator assembly 610 in accordance with an alternative embodiment of the invention. The inflator assembly 610 is generally similar to the inflator assembly 510 illustrated in FIG. 5 and described above. The inflator assembly 610, similar to the inflator assembly 510, includes a first or storage chamber 612 that is filled and pressurized with contents 614 effective to provide a gaseous inflation medium such as may be used in the inflation of an associated inflatable device and such as described above. In particular, the storage chamber contents 614 may desirably include a supply of oxygen and a quantity of at least one unreactive reaction modifier, e.g., carbon dioxide. As also described above, the storage chamber contents 614 may desirably be stored in at least partially liquefied form such as may desirably reduce or minimize the size associated with such storage chamber.

The chamber 614 is defined in part by an elongated generally cylindrical sleeve 616 having a first end 620 and a second end 622. The first end 620 is closed by means of a diffuser assembly 626, such as generally similar to the diffuser assembly 526 described above. The diffuser assembly 626 includes a plurality of openings 632, wherethrough the inflation gas from the inflator assembly 610 is properly dispensed into the associated occupant restraint (not shown).

The contents of the chamber 614 are normally kept separated from the diffuser assembly 626 and contained within the chamber 614 through the inclusion of a selected sealing means, e.g., by means of a burst disk 630 in sealing relationship therebetween.

The sleeve second end 622 is partially closed by a base wall 634. The base wall 634 includes an opening 636 therein, wherethrough a heat source 640 such as described in greater detail below, is attached in sealing relation within the storage chamber 616. As will be appreciated, such attachment can be effected by various appropriate means such as with a weld, crimp or other suitable hermetic seal, for example.

The heat source 640, similar to the heat source 540 described above, includes an initiator device 642 and a cup 644 containing a load of gas generant reactant such as described above, designated by the reference numeral 646 adjacent the discharge end 642a of the initiator device 642 such as in reaction initiation communication with the initiator device 642. The heat source 640, however, stores or contains the gas generant reactant load 646 under the influence of the contents of the storage chamber 614. More specifically, the cup 644 is composed of perforated or the like, such as screen, for example, steel or other selected metal to permit contact by and between the contents of the storage chamber 614 and the stored gas generant reactant 646. Such inflator assemblies in which such heat source load of gas generant reactant material 646 is stored under the conditions within the storage chamber 614 may be less subject to internal pressure extremes upon actuation and thus preferred for at least certain particular inflator installations.

In addition, as such inflator assemblies may more easily permit interaction and communication by and between the gas generant reactant material 646 and the contents of the storage chamber 612, such assemblies may facilitate the use of an under-oxidized, e.g., an oxygen-deficient, gas generant reactant such as described above. For example, with such assemblies, oxygen present as a part of the contents of the storage chamber 612 may more readily be available for desired reaction interaction with the gas generant reactant 646.

Further, as the gas generant reactant 646 is stored directly exposed to stored oxygen, such an inflator apparatus design generally affords various combustion processing advantages such as reduced or minimized ignition delays and more complete combustion of stored gas generant reactant. The inflator apparatus 610 may, however, suffer from the same or similar rise rate limitations as described above relative to the inflator assembly 510.

It will be appreciated that while the invention has been described above relative to inflator devices wherein opening of the respective oxygen-containing storage chambers is realized through non-mechanical means, the broader practice of the invention is not necessarily so limited.

Figure 7:
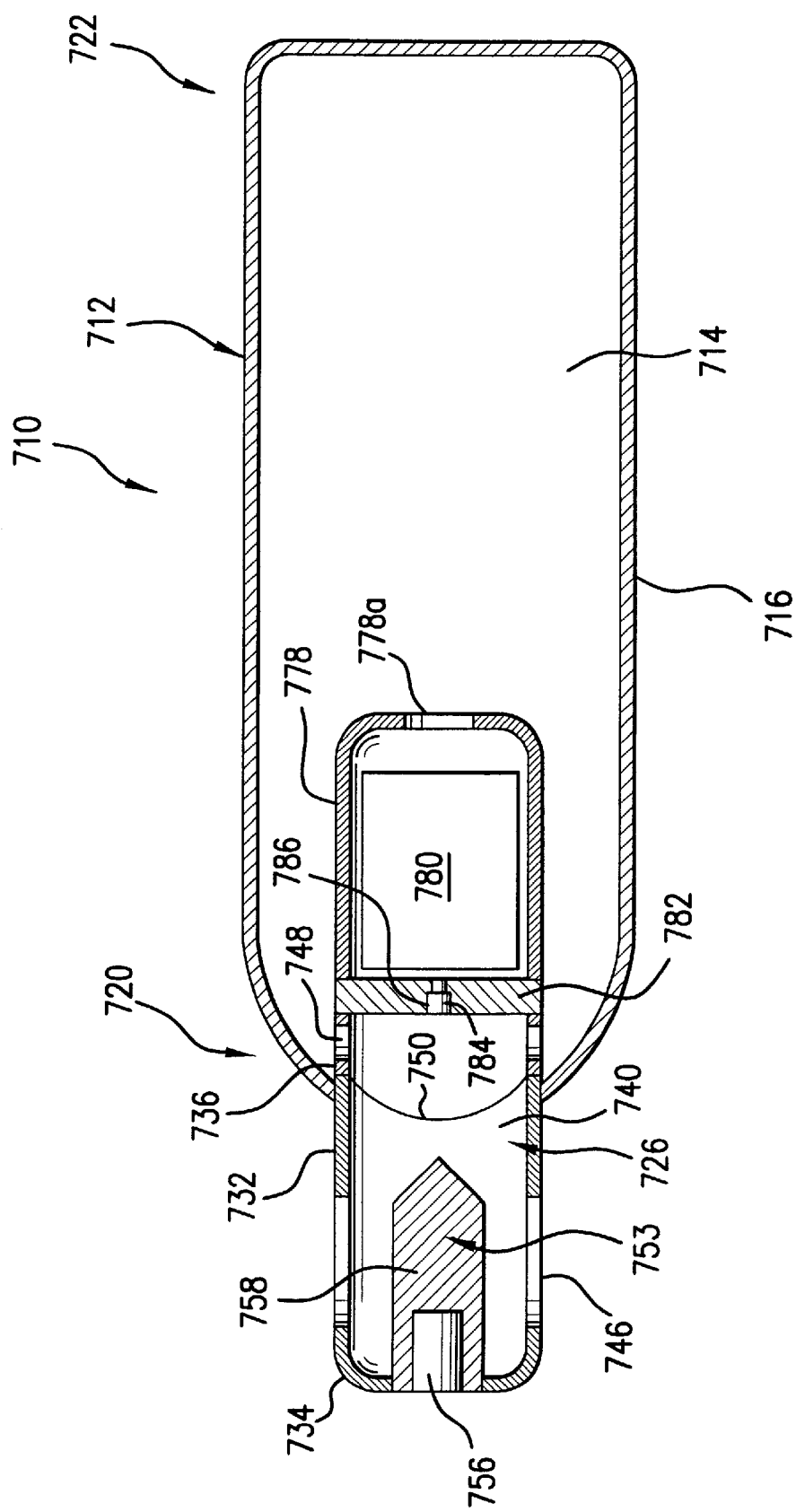
FIG. 7 is a simplified, partially in section, schematic drawing of an airbag inflator in accordance with yet still another embodiment of the invention.

For example, FIG. 7 is a simplified, partially in section, schematic drawing of an airbag inflator assembly, generally designated by the reference numeral 710, in accordance with one such embodiment of the invention. The airbag inflator assembly 710 is many respects similar to the inflator assembly 510, described above, and includes a first or storage chamber 712 that is filled and pressurized with contents 714 effective to provide a gaseous inflation medium such as may be used in the inflation of an associated inflatable device and such as described above. In particular, the storage chamber contents 714 may desirably include a supply of oxygen and a quantity of at least one unreactive reaction modifier, e.g., carbon dioxide. As also described above, the storage chamber contents 714 may desirably be stored in at least partially liquefied form such as may desirably reduce or minimize the size associated with such storage chamber.

The chamber 712 is defined by an elongated generally cylindrical sleeve 716, having a first end 720 and a second end 722. A diffuser assembly 726 is attached with a shoulder portion 724 at the first end 720.

The diffuser assembly 726 includes a generally cylindrical sleeve 732 having a cap portion 734 and a base portion 736 to define a diffuser chamber 740 with a rupture disk 750 serving to separate the contents of the chamber 712 from the associated airbag (not shown). The diffuser assembly cap and base portions, 734 and 736, respectively, each includes a plurality of openings 746 and 748.

The diffuser assembly 726 includes opening means 753 to open the sealing means, e.g., the rupture disk 750. The opening means 753 is illustrated in the form of a squib 756 and an associated projectile 758.

The inflator assembly 710 also includes a gas generant reactant chamber 778 containing a quantity of a gas generant reactant 780, such as described above, adjacent the diffuser chamber 740. In addition, the wall 782 between the diffuser chamber 740 and the gas generant reactant chamber 778 includes an igniter storage volume 784 containing an igniter material 786 such as including an appropriate primer material such as known in the art, such as of a lead styphnate tetracene type non-corrosive mixture and, if desired, a secondary ignition charge such as formed of boron potassium nitrate. The igniter material 786, when actuated, serves to ignite at least a portion of the gas generant reactant 780.

The gas generant reactant chamber 778 has an outlet opening 778a wherethrough gas generant reaction products including, for example, gas and heat such as produced upon the combustion of the gas generant reactant material, can exit the gas generant chamber 778 and be in fluid communication with the contents of the storage chamber 712.

In the static or normal state for the inflator assembly 710, the outlet opening 778a can, if desired and as shown, be in an open condition. In such an embodiment, the gas generant reactant material 780 can desirably be held directly under the influence of the oxygen-including contents 714, which, as described above, are preferably at least partially in liquefied form.

It is to be understood, however, that the outlet opening, can if desired, be closed or sealed by the incorporation of an appropriate closure. For example, the inclusion of such a closure may be desired where the stored or static state isolation of the gas generant reactant material from the contents of the storage chamber 712 is desired. It will be appreciated that, dependent on the specific assembly design and operation, such an appropriate closure can take various forms including that of a foil seal or a rupture disc, for example.

In operation, such as upon the sensing of a collision, an electrical signal is sent to the opening means 753 (e.g., the squib 756). Upon receipt of an appropriate signal, the opening means 753 is actuated such that the squib 756 fires and propels the projectile 758 into the burst disk 750 whereby the disk 750 ruptures or otherwise permits the passage of a portion of the stored contents of the chamber 712 through the openings 746 into the associated airbag assembly.

In such operation, the projectile 758, after contacting and resulting in the opening of the rupture disk 750, proceeds to contact and initiate the igniter material 786, resulting in the ignition thereof. In turn, gas generation via the reaction of the gas generant reactant material 780 is initiated. Gas and heat produced as a result of reaction of the gas generant reactant material exit the gas generant chamber 778 through the opening 778a and is placed in fluid communication with the contents of the storage chamber 712, resulting in the further heating thereof.

The inflator assembly 710 represents one preferred mode of the invention as such an assembly can more freely permit or allow for the flow of oxygen over the gas generant reactant to desirably be controlled to occur over a prolonged period of time and at desired specified rates. As a result, such an assembly can permit the better control of the combustion process between stored gas generant reactant and stored oxygen. However, as such an inflator assembly involves the use of a relatively large number of component parts, the relative cost of such a device may outweigh practical possible operational benefits that might be thereby obtained.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Example 1 and Comparative Examples 1 and 2

Figure 8:
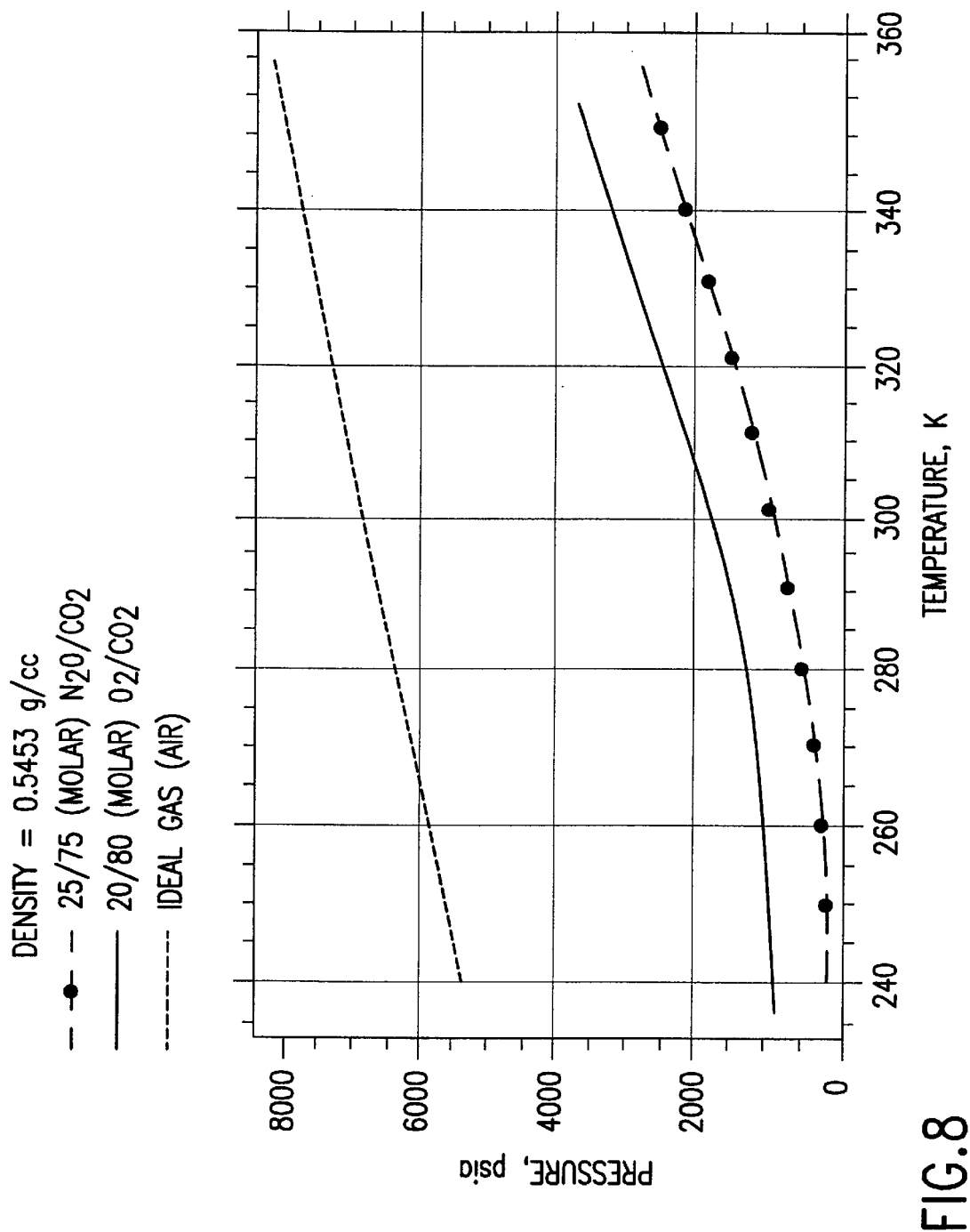
FIG. 8 is a graphical depiction of the pressure-temperature relationship for the different specified stored fluids of Example 1 and Comparative Examples 1 and 2.

FIG. 8 illustrates the pressure-temperature relationship for specific stored fluid mixtures, each having a mixture density of 0.545 g/cc. In particular, FIG. 8 illustrates the pressure-temperature relationship for a stored fluid composed of a 20/80 molar mixture of oxygen and carbon dioxide in accordance with the invention (Example 1), air as described by the ideal gas (Comparative Example 1) and a 25/75 molar mixture of nitrous oxide and carbon dioxide (Comparative Example 2) such as in accordance with the above-identified related prior U.S. patent application Ser. No. 09/495,975. The mixture density of 0.545 g/cc was selected for use as representative of common mixture densities used in liquified gas airbag inflator designs.

With regard to Comparative Example 1, air can be considered to be composed of about 78.1% nitrogen, 21.0% oxygen and 0.9% argon, on a molar basis. Given a constant density, the ideal gas law predicts a linear relationship between pressure and temperature. Note that at a temperature of about 295 K, the pressure of the ideal gas mixture is very high—about 6575 psia (46.5 MPa). While such a pressure can be produced and maintained in a compressed gas inflator design, those skilled in the art will appreciate that such pressures are generally significantly higher than may be desired or commonly acceptable in existing inflator designs.

With regard to Comparative Example 2, those skilled in the art will appreciate that under these conditions the nitrous oxide and carbon dioxide mixture is a highly non-ideal, partially liquefied gas mixture.

With regard to Example 1, the subject mixture was also highly non-ideal in behavior and partially liquefied. While the pressures obtained or realized in such a system at a selected temperature within the illustrated range was not as low as that in a nitrous oxide-carbon dioxide system, as shown relative to Comparative Example 2, these pressures are still significantly below the pressures of the ideal gas mixture (Comparative Example 1).

In view of the above, it is to be appreciated that for a given density, the pressure of a liquified gas mixture in accordance with the invention is significantly lower than the pressure of an ideal gas mixture. Further, at the same pressure, more liquified gas in accordance with the invention can be stored in the same volume as compared to an ideal gas, e.g., the density of such liquefied gases is greater than that of an ideal gas. Since an airbag cushion inflatable device requires a certain amount of inflation medium in order to be properly inflated, a greater mass of a liquefied gas can be stored in a given volume, as compared to an ideal gas. As a result, a corresponding compressed gas inflator device can be made in a physically smaller form. Further, smaller inflator devices are commonly less costly to make as, for example, the materials of construction are also typically correspondingly reduced.

Example 2

In this example, a test inflator identical in structure to the inflator illustrated in FIG. 1 was constructed. This test inflator included a combustion chamber ("58") with a total volume of 2.3 cubic inches (37.7 cc), a gas/liquid storage chamber ("12") with a total volume of 14 cubic inches (229.4 cc), a burst disk ("80") having a thickness of 0.01 in (0.25 mm), a nozzle discharge opening ("79") having a diameter of 0.23 in (5.8 mm), and included four exit ports ("46") each having a diameter of about 0.182 in (4.62 mm).

The gas/liquid storage chamber ("12") was filled with 10% oxygen, 80% carbon dioxide and 10% helium (molar basis), in accordance with the invention.

The combustion chamber ("58") was filled with a solid gas generant mixture containing guanidine nitrate fuel, an ammonium nitrate and copper diamine dinitrate oxidizer mixture and a silicon dioxide burn rate enhancing/slag formation additive. The solid gas generant mixture had an equivalence ratio of 1.11 (e.g., the generant mixture was fuel-rich). Given this generant formulation, some formation of oxides of nitrogen would normally be expected since nitrogen was present in the gas generant.

The loaded test inflator device was mated to a 100-liter test tank. The test tank was equipped with a pressure transducer, and the tank pressure vs. time performance, realized upon the firing of the test inflator device, recorded by means of the pressure transducer and an associated data collection system. The test inflator device was also provided with a pressure transducer to measure the pressure within the storage chamber thereof and a pressure transducer to measure the pressure within combustion chamber thereof. The storage chamber pressure vs. time performance and the combustion chamber vs. time performance, realized upon the firing of the test inflator device, were also recorded by means of a data collection system.

Figure 9:
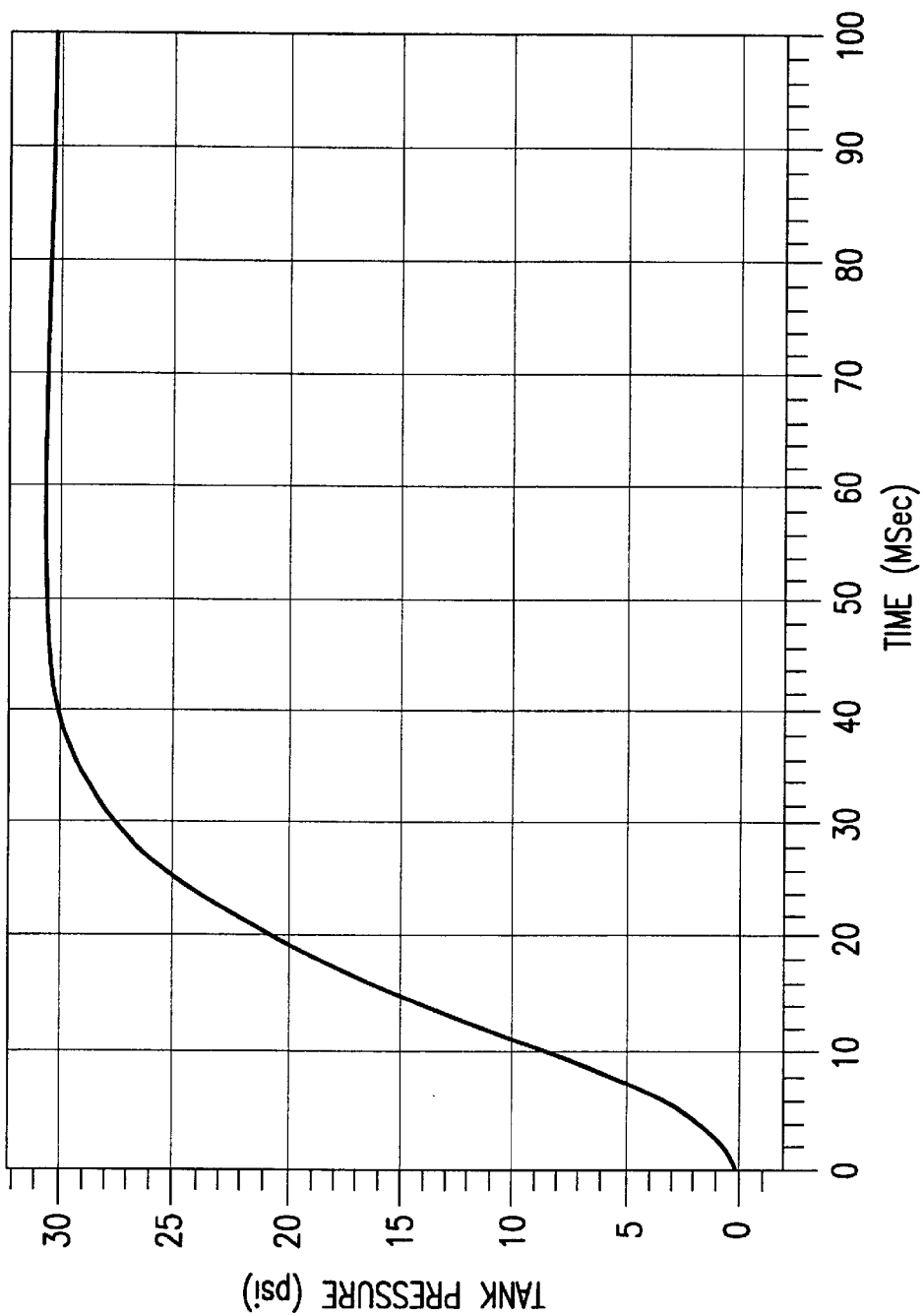
FIG 9 is a graphical depiction of tank pressure as a function of time performance realized in Example 2.
Figure 10:
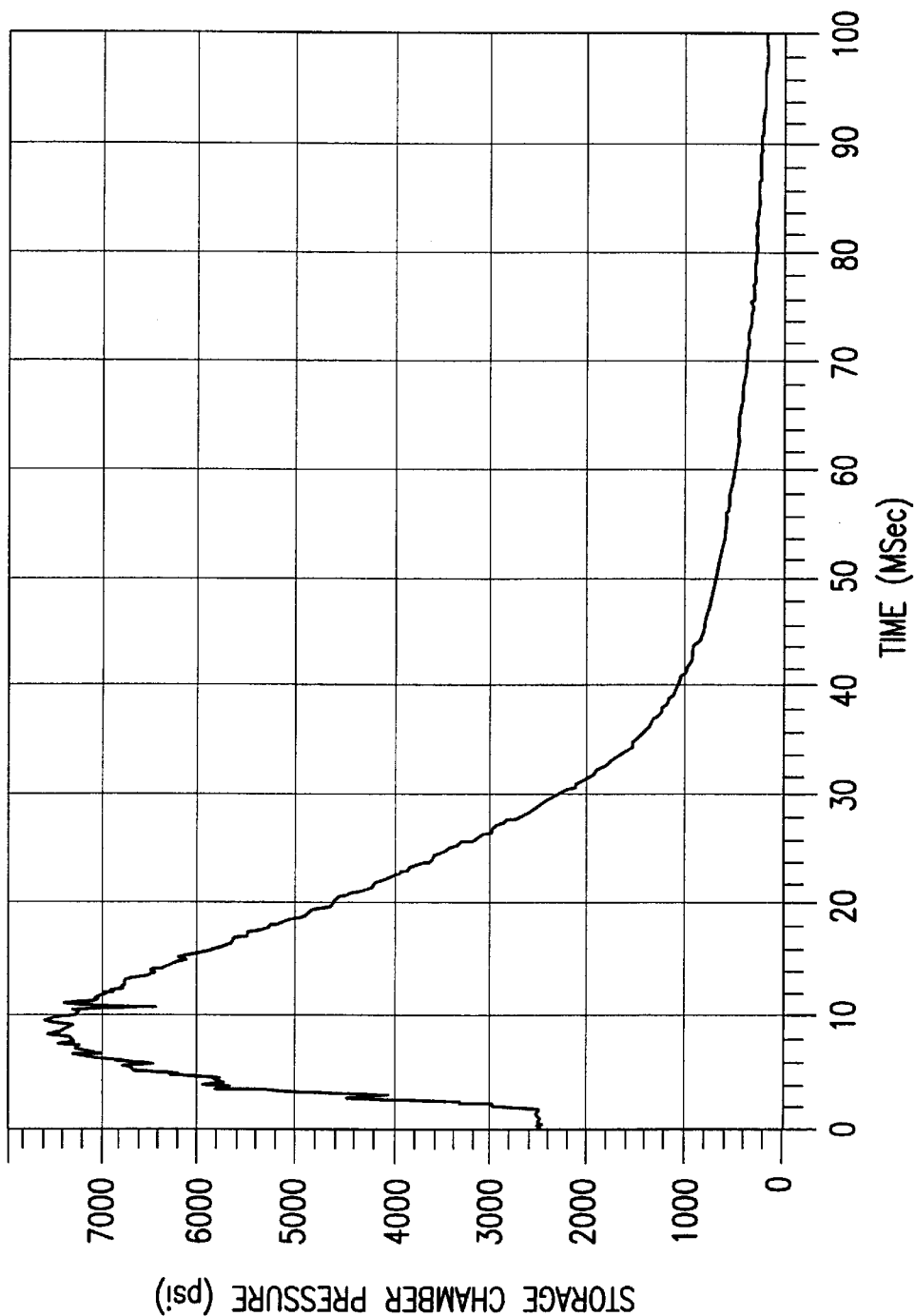
FIG. 10 is a graphical depiction of storage chamber pressure as a function of time performance realized in Example 2.
Figure 11:
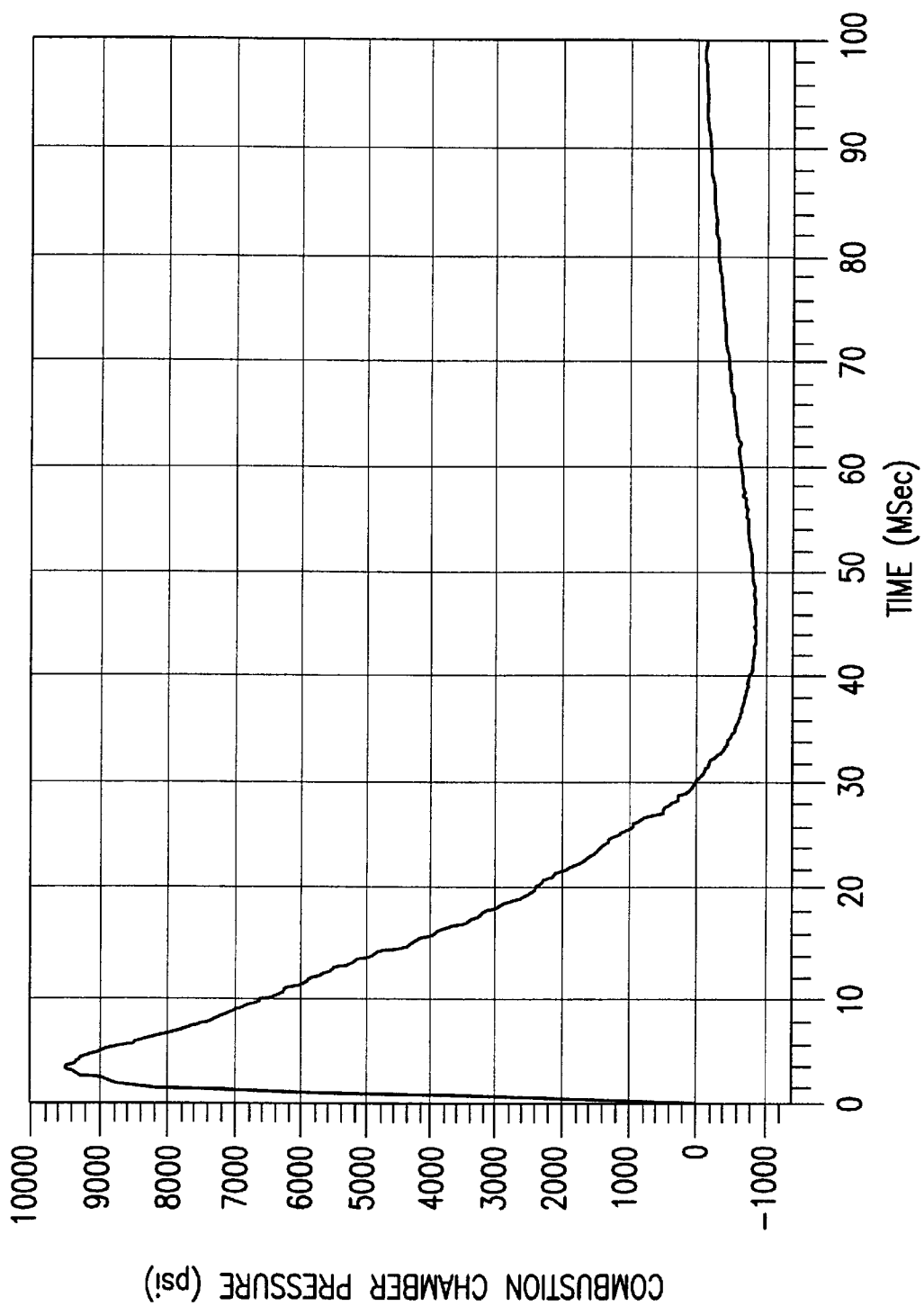
FIG. 11 is a graphical depiction of combustion chamber pressure as a function of time performance realized in Example 2.

FIGS. 9–11 illustrate the performance realized with the test inflator of EXAMPLE 2. More particularly, FIGS. 9–11 are graphical depictions of tank pressure, storage chamber pressure and combustion chamber pressure, respectively, each as a function of time subsequent to inflator actuation for the test inflator of EXAMPLE 2.

Further, effluent analysis using mass spectrometry and FTIR techniques were conducted to quantify the constituents in the effluent product from the test inflator device.

DISCUSSION OF RESULTS

Given the loads described above, the total molar output of the test inflator was 4.25 gmol. In view thereof, the measured tank performance was indicative of that required to adequately inflate a common (e.g., 120 to 130 liter) passenger-sized automotive airbag cushion. Further, the time to maximum pressure in the tank pressure plot (FIG. 9) of about 45 milliseconds is consistent with typical passenger inflator design. In addition, the internal pressures (storage chamber and combustion chamber) measured within the test inflator device were well within the range of those typically found in compressed gas inflation systems.

The effluent analysis indicated that about 25 mass percent of the oxygen originally stored in the test inflator device storage chamber participated in the combustion of the gas generant reactant mixture. This figure was calculated based on consideration of the final oxygen concentration in the 100-liter test tank as well as the initial loading condition of the pressure vessel. (Given 140 grams of a $10/80/10O_2/CO_2/$He molar mixture, the test inflator storage chamber initially contained about 11.5 grams of oxygen.) Analysis clearly indicates that oxygen from the storage chamber did not merely escape from the test inflator device, rather about 25% of the storage chamber stored oxygen content must have been consumed. This also correlates with the stoichiometry of the gas generate reactant material as, based on the equivalence ratio of 1.11 and an initial load of 25 grams, roughly an additional 2.5 grams of oxidant would be expected to required to fully oxidize the combustion products.

Thus, the invention provides an inflation apparatus and techniques for inflating an inflatable device wherein the envelope required by the apparatus can desirably be reduced or minimized to a greater extent than otherwise or previously possible or realizable while at the same time reducing or minimizing the amounts or concentrations of undesirable oxides of nitrogen ($NO_x$), such as NO and $NO_2$, resulting therefrom.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an apparatus for inflating an inflatable device wherein a gas generant reactant reacts with oxygen to produce a gaseous inflation medium, the improvement comprising:
    a closed first chamber having contents free of nitrous oxide and which contents include a supply of oxygen and a quantity of at least one unreactive reaction modifier selected from a group consisting of $CO_2$, Xe, $SF_6$ and mixtures thereof, and
    an initiator to initiate reaction of at least a fraction of the supply of oxygen with the gas generant reactant to produce a quantity of the gaseous inflation medium.

2. The apparatus of claim 1 wherein at least a portion of the quantity of at least one unreactive reaction modifier is stored within the closed first chamber at least partially in liquefied form in fluid contact with at least a portion of the supply of oxygen.

3. The apparatus of claim 1 wherein the gas generant reactant comprises a pyrotechnic.

4. The apparatus of claim 3 wherein the pyrotechnic is oxygen-deficient.

5. The apparatus of claim 1 wherein the gas generant reactant is oxygen-deficient.

6. The apparatus of claim 1 wherein the reaction modifier is $CO_2$.

7. The apparatus of claim 1 additionally comprises a diffuser assembly including at least one exit port for directing at least a portion of the gaseous inflation medium to the inflatable device.

8. The apparatus of claim 1 additionally comprising:
    a second chamber wherein the gas generant reactant is stored external to the first chamber and in discharge communication with the initiator.

9. The apparatus of claim 8 wherein discharge of the initiator onto the gas generant reactant produces discharge products effective to open the first chamber and place at least a portion of the first chamber contents in contact with one or more of the discharge products, remaining unreacted gas generant and remaining not fully reacted gas generant.

10. The apparatus of claim 1 wherein the contents of the first chamber include the gas generant reactant in contact with at least a portion of the supply of oxygen.

11. In an apparatus for inflating an inflatable device wherein a gas generant reactant reacts with oxygen to produce a gaseous inflation medium, the improvement comprising:
    a closed first chamber having contents free of nitrous oxide and which contents include a supply of oxygen and a quantity of an unreactive reaction modifier comprising $CO_2$, and
    an initiator to initiate reaction of at least a fraction of the supply of oxygen with the gas generant reactant to produce a quantity of the gaseous inflation medium;
    wherein the gas generant reactant is oxygen-deficient.

12. The apparatus of claim 11 wherein at least a portion of the quantity of at least one unreactive reaction modifier is stored within the closed first chamber at least partially in liquefied form in fluid contact with at least a portion of the supply of oxygen.

13. The apparatus of claim 11 wherein the gas generant reactant comprises a pyrotechnic.

14. The apparatus of claim 11 additionally comprising:
    a second chamber wherein the gas generant reactant is stored external to the first chamber and in discharge communication with the initiator.

15. The apparatus of claim 14 wherein discharge of the initiator onto the gas generant reactant produces discharge products effective to open the first chamber and place at least a portion of the first chamber contents in contact with one or more of the discharge products, remaining unreacted gas generant and remaining not fully reacted gas generant.

16. The apparatus of claim 11 wherein the contents of the first chamber include the gas generant reactant in contact with at least a portion of the supply of oxygen.

17. In an apparatus for inflating an inflatable device wherein a gas generant reactant reacts with oxygen to produce a gaseous inflation medium, the improvement comprising:
    a closed first chamber having contents free of nitrous oxide and which contents include a supply of oxygen and a quantity of at least one unreactive reaction modifier selected from a group consisting of $CO_2$, Xe, $SF_6$ and mixtures thereof,
    an initiator to initiate reaction of at least a fraction of the supply of oxygen with the gas generant reactant to produce a quantity of the gaseous inflation medium, and a second chamber wherein the gas generant reactant is stored external to the first chamber and in discharge communication with the initiator wherein discharge of the initiator onto the gas generant reactant produces discharge products effective to open the first chamber and place at least a portion of the first chamber contents in contact with one or more of the discharge products, remaining unreacted gas generant and remaining not fully reacted gas generant.

18. The apparatus of claim 17 wherein at least a portion of the quantity of at least one unreactive reaction modifier is stored within the closed first chamber at least partially in liquefied form in fluid contact with at least a portion of the supply of oxygen.

19. The apparatus of claim 17 wherein the gas generant reactant comprises a pyrotechnic.

20. The apparatus of claim 19 wherein the pyrotechnic is oxygen-deficient.

21. The apparatus of claim 17 wherein the gas generant reactant is oxygen-deficient.

22. The apparatus of claim 17 wherein the reaction modifier is $CO_2$.

23. The apparatus of claim 17 wherein the contents of the first chamber include the gas generant reactant in contact with at least a portion of the supply of oxygen.

* * * * *